P. STEIL.
BEET TOPPER, DIGGER, AND LOADER.
APPLICATION FILED MAR. 3, 1915.
1,251,589.
Patented Jan. 1, 1918.
4 SHEETS—SHEET 1.
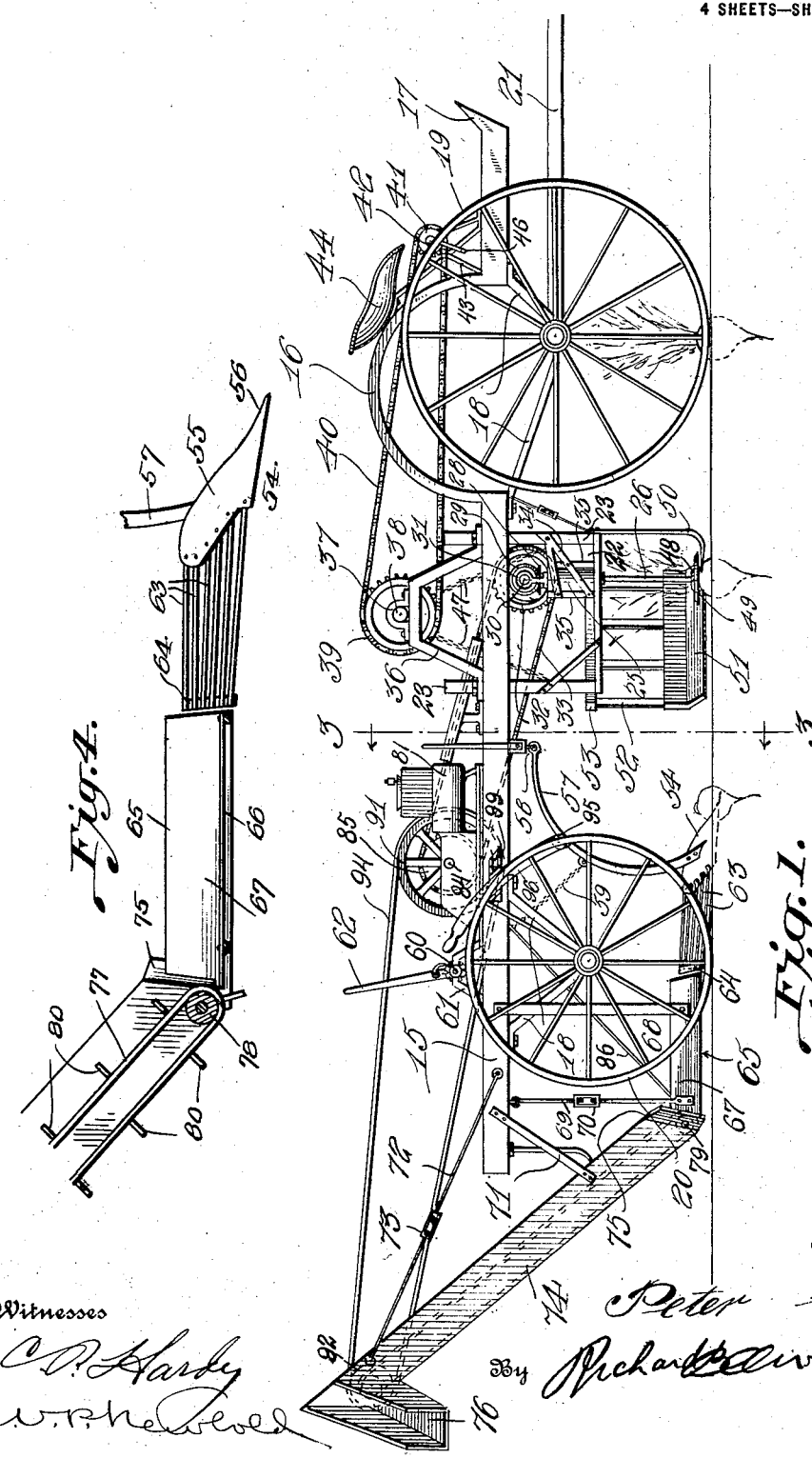

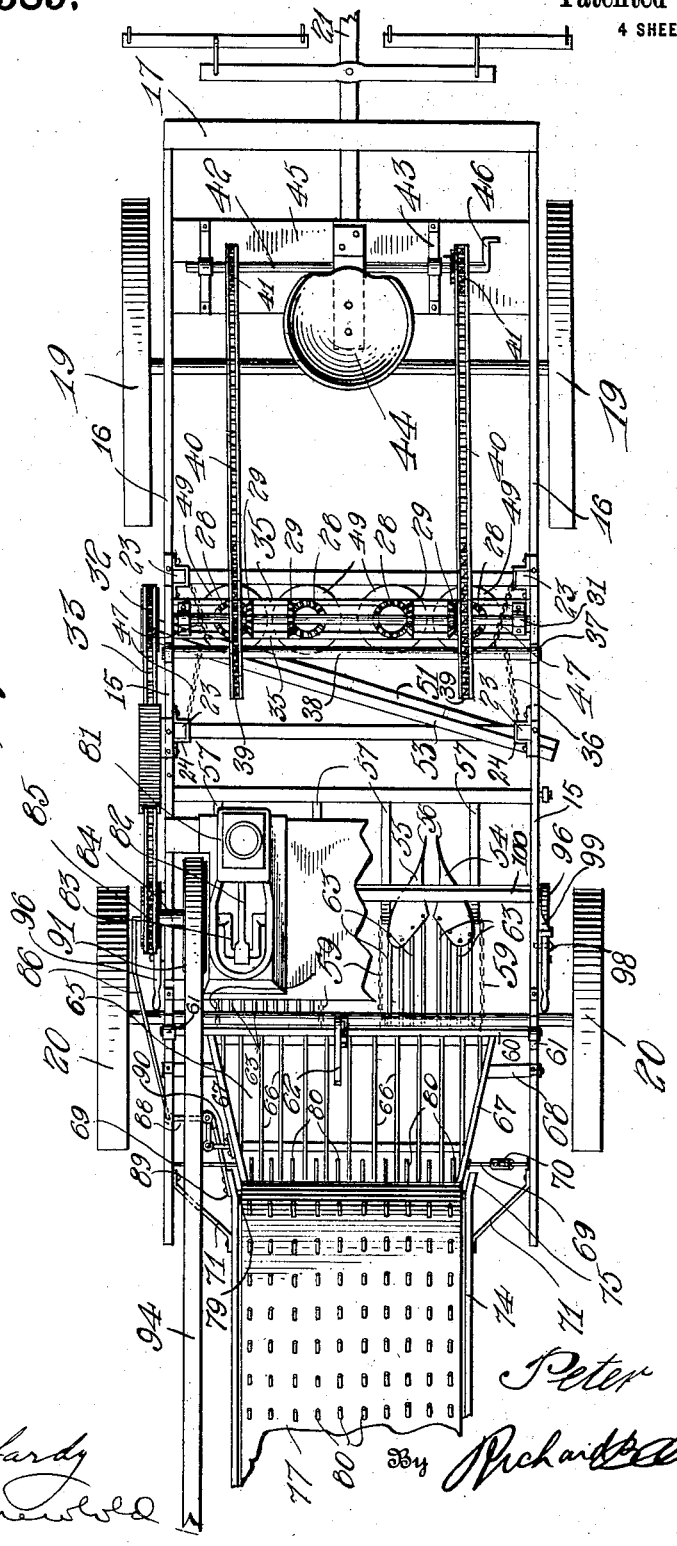

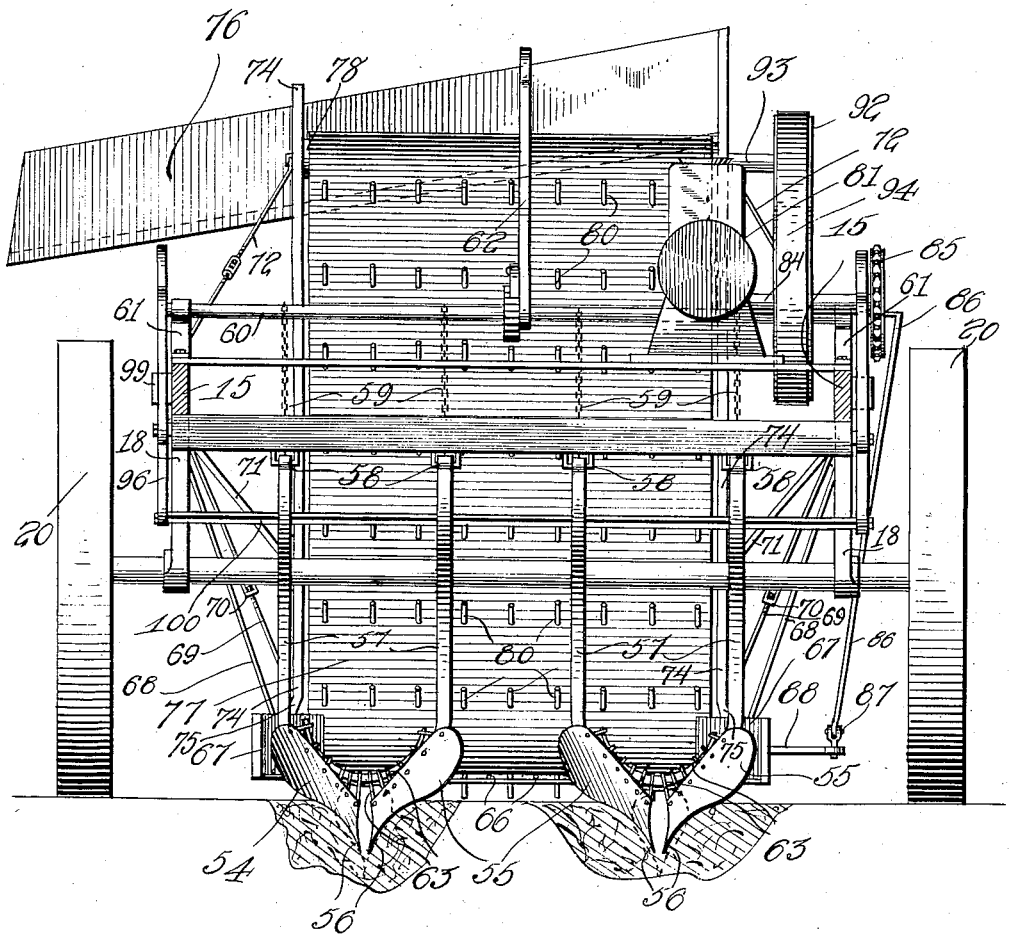

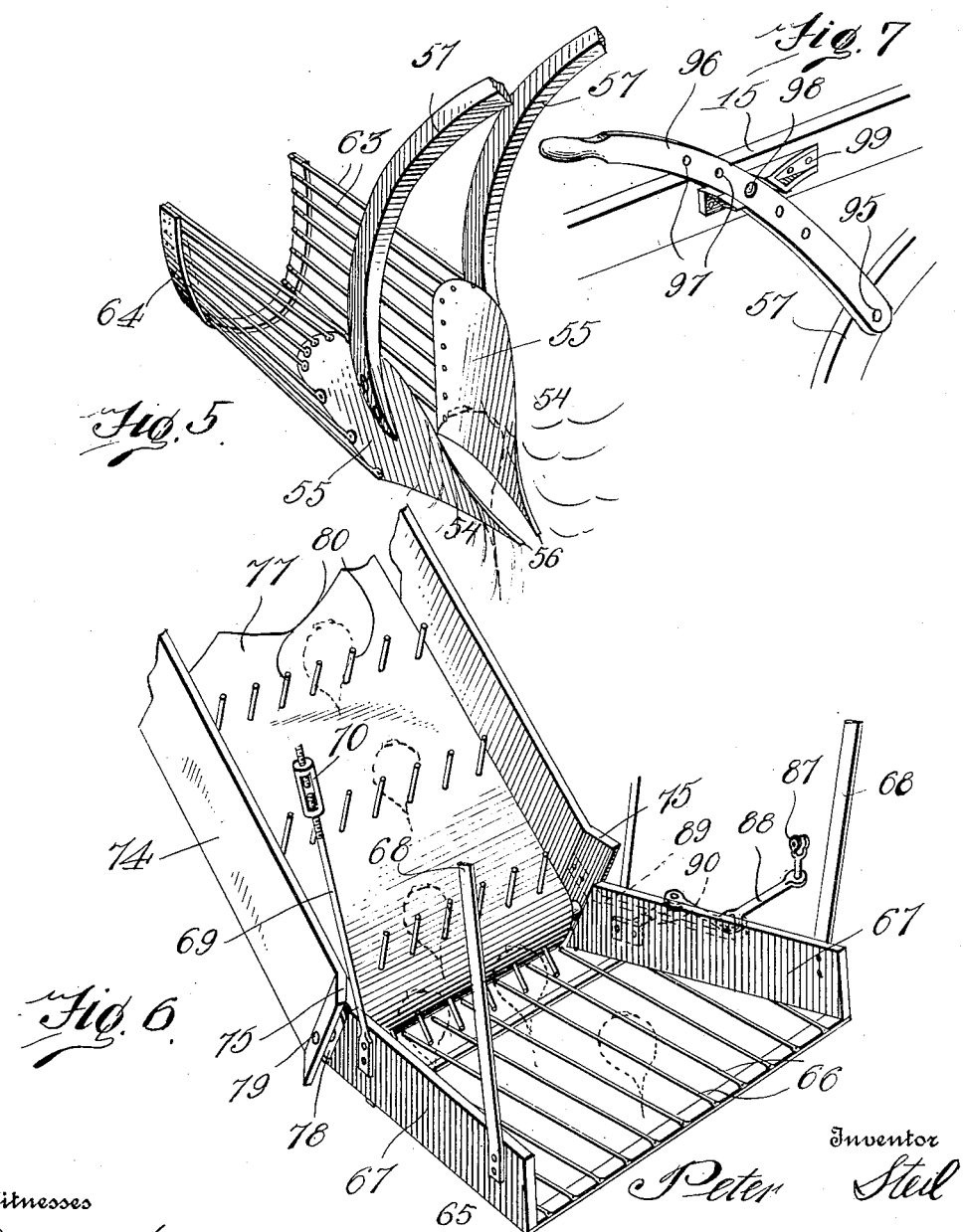

UNITED STATES PATENT OFFICE.

PETER STEIL, OF FAIRBANKS, TERRITORY OF ALASKA.

BEET TOPPER, DIGGER, AND LOADER.

1,251,589.         Specification of Letters Patent.         Patented Jan. 1, 1918.

Application filed March 3, 1915. Serial No. 11,794.

*To all whom it may concern:*

Be it known that I, PETER STEIL, a citizen of the United States, residing at Fairbanks, in the Territory of Alaska, have invented certain new and useful Improvements in Beet Toppers, Diggers, and Loaders, of which the following is a specification.

This invention relates to harvesters and more particularly relates to a harvesting machine which shall be particularly adapted for topping, digging and loading beets.

As a particular object, this invention aims to provide a beet harvester which shall, in proceeding down successive rows of the cultivated area, remove the beets from the ground, ridding them automatically as they pass from the digging devices of the larger portion of their accumulated dirt to be finally delivered from the machine in such a manner as to readily permit of their being loaded upon accompanying wagons.

A further object is to provide plows to be used in oppositely disposed pairs and to similarly follow each throw in digging successive beets therefrom and in conveying them rearwardly to the point of loading.

The above and additional specific objects are accomplished by such means as are illustrated in the accompanying drawings, described in the following specification, and then more particularly pointed out in the claims which are appended hereto and form a part of this application.

With reference to the drawings, wherein there is illustrated the preferred embodiment of this invention as it is reduced to practice and throughout the several views of which like characters of reference designate similar parts:

Figure 1 is a side elevation of a beet harvester as constructed in accordance with, and comprehended by, this invention.

Fig. 2 is a plan view of the matter disclosed in Fig. 1, parts being broken away both for lack of space and to show the interior construction.

Fig. 3 is a transverse section through the device taken on the vertical plane indicated by the line 3—3 of Fig. 1, looking rearwardly of the harvester.

Fig. 4 is an enlarged detail sectional view taken through one of the plows and the conveyer.

Fig. 5 is a perspective view illustrating one of the plow sets.

Fig. 6 is a perspective view showing the oscillatory dirt remover and a portion of the conveyer.

Fig. 7 is a fragmentary view in perspective illustrating the locking or retaining lever for the plow member.

There is illustrated a harvester of the type mentioned formed with a frame including side pieces 15 at the forward end of which are positioned arches 16, and transverse pieces 17 in any well-known and desirable manner and formed either from wood or more durable metallic material. Brackets 18 depending from the frame, support the forward wheels 19 and the rearward wheels 20 of the vehicle, the former being relatively larger in order to insure a smoother travel over the roughened surface of cultivated fields upon which this machine will be used. As illustrated in Figs. 1 and 2, the vehicle is adapted to be drawn by animals since a tongue 21 is shown provided, but it is to be remembered that the distinctive mechanism of this harvester as will be hereinafter more particularly pointed out may be used in connection with any form of tractor desired.

Under certain conditions topping devices comprising disks 49 with means for supporting and rotating them may be mounted upon the machine for cutting off the tops of the beets before digging them, but as this mechanism forms no part of the present invention, detail reference thereto will not be made.

The digging mechanism which is adapted to take care of the embedded beets after their tops have been removed comprises a pair of oppositely disposed plow members 54 arranged to follow each beet row, each of which plows is formed with a mold-board 55 widening to the rear end with a point 56 which provides the usual furrow through the beet rows. Since these plows are spaced in pairs, it will be apparent after a perusal of Fig. 3 that in the forward travel of the vehicle a beet whose top has previously been removed will have the earth loosened about it from all sides simultaneously by one pair of the plow members 54 and will accordingly be forced toward the rear at the channel provided between the plows of each pair. The plows are supported on curved beams 57 which are pivoted to suitable brackets mounted on the frame 15 as indicated by the numeral 58. Flexible connections 59 are secured to each plow beam intermediate of its curvature and lead to a shaft 60 mounted on brackets 61 and controlled by a hand lever 62 so that rotation of this shaft may be utilized to raise or lower the plow beams.

Secured to the plows of each pair in such a manner as to form collectively a semi-cylindrical passageway are the rods 63 which connect rearwardly to an arcuate retaining band 64 as is particularly illustrated in the perspective view of Fig. 5. Positioned directly to the rear of the slatted passage formed by the rods 63 but not interfering with the upward circular movement of the plow members 54, is a receiving platform 65 suspended by bars 68 and 69 from the frame 15.

Secured by braces 71 to the rear portion of the vehicle frame 15 is a rearwardly extending elevator or conveyer designated as a whole by the numeral 74, its lower end embracing the rear end of the platfrom 65 and having at its upper end the laterally directed channel portion 76.

A locking means is also preferably provided as illustrated in Fig. 7, for the plow beams 57, such locking means operating on the outside beam to which it is pivoted as at 95 and comprising a lever 96 formed with a plurality of longitudinal apertures 97 which are adapted to receive a pin 98 which is carried in an arcuately formed bracket 99 carried upon the frame 15 so that if the pin 98 is inserted in one of the longitudinal apertures of the lever, movement in either direction on the part of the plow beams 57 is prevented since all of these beams are connected by a cross rod 100, the ends of which are secured in the mentioned lever 96, it being understood that one of these levers is provided upon each side of the frame.

In operation, the harvester is driven longitudinally of the beet rows in the obvious manner with each pair of plow sets in alinement with their beet row as will be apparent. The beets in the two rows straddled by the machine disclosed are engaged by a set of plows 54 for each row which remove the beets from the earth and through the forward movement of the machine the beets and more or less soil pass rearwardly between each pair of plows and over the semi-cylindrical channel formed by the slats 63 through which the soil falls, the beets, however, continue rearwardly to the end of the channel where they are delivered upon the platform 65. From thence the beets pass to the conveyer belt as is illustrated in Fig. 6 which it will be understood carries the beets to the upper portion of the elevator, whence they may be sent down the lateral chute 76 into accompanying wagons which may be filled at this point as the harvester progresses and then make way for similar following wagons. It is to be understood that a harvester may be constructed according to the tenets of this invention which shall straddle more beet rows if desired or shall be otherwise constructed in such a manner that the preceding objects as above set forth are attained in a similar manner and that the spirit of this invention is not departed from as defined by the appended claims.

While in the foregoing however, there has thus been illustrated in the drawings and described in the specification, such combination and arrangement of elements as constitute the preferred embodiment of this invention, it is desired to emphasize the fact that such minor changes in the matters of proportion and degree may be made in later adaptations of this device, as shall not alter the spirit of the invention as defined in the appended claims.

What is claimed is:—

1. A beet harvester comprising a wheel-supported frame, plows grouped in pairs of oppositely inclined members for unearthing topped beets, rods secured directly to the mold boards of said plows to form a semi-cylindrical passageway leading rearwardly through which passageway the beets pass for delivery, a pivoted beam for each plow, means for controlling the vertical adjustment of all the plows simultaneously, a horizontally suspended beet receiving platform at the delivery end of said passage way, and an upwardly inclined elevator located rearwardly of said frame for exteriorly disposing of the beets unearthed by said plows.

2. A beet harvester comprising a wheel-supported frame, plows grouped in pairs of oppositely inclined members for unearthing topped beets, each pair being oppositely disposed, beams pivotally mounting each of said plows, manually operable means controlling the swinging movement of said plow beams, manually operable locking means for preventing movement of said plow beams, and means for delivering from the machine beets unearthed by said plows.

3. A beet harvester comprising a wheel-supported frame, plows grouped in pairs of oppositely disposed members, rods secured to said plows and extending rearwardly in a semi-circular arrangement to form a passageway for beets unearthed by said plows, beams pivotally mounting said plows, means manually controlling movement of said plows, an arcuate lever on each side of the machine, a rod pivoted to said levers and passing through each of said plow beams, means for locking said levers to the frame for holding the plows immovable, and means for disposing of unearthed beets.

4. A beet harvester including a wheel-supported frame, plows pivoted intermediate of said frame to unearth topped beets, means mounted on said frame and flexibly connected to said plows for controlling the movement thereof, means for locking said plows in position after adjustment, rods secured to pairs of adjacent plows and arranged to form a rearwardly directed semi-cylindrical passageway to guide the beets unearthed by the plows, a platform upon which said beets are deposited after passing through said passageway, and means for removing the beets after being deposited on said platform from the machine.

In testimony whereof I affix my signature in presence of two witnesses.

PETER STEIL.

Witnesses:
S. B. CLOUGH,
PETER DEISER.